May 22, 1962 J. S. COURTNEY-PRATT 3,036,152
HIGH SPEED SHUTTER
Filed Oct. 14, 1960
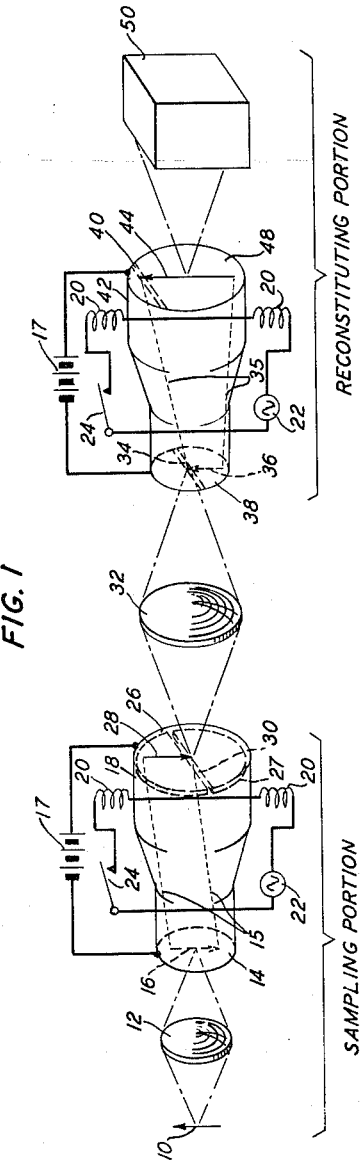
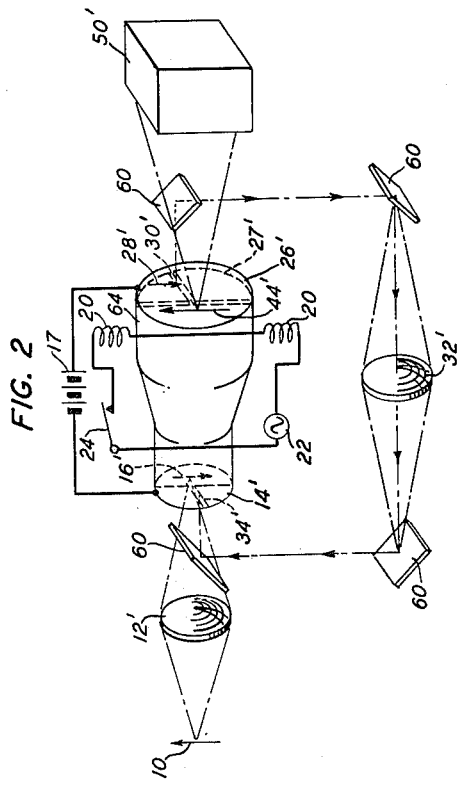
INVENTOR
J. S. COURTNEY-PRATT
BY
H. O. Wright
ATTORNEY tensity of which at each point is proportional to the number of electrons instantly impinging upon that point. A mask 27, opaque to electrons except that it has a horizontal diametral slit 30 transparent to electrons bisecting it, is placed against the left or inner surface of screen 26 so that electrons can reach screen 26 only through slit 30. Alternatively, the mask 27 can be placed on the right or outer surface of screen 26, or, in the event that a more complex lens system is substituted for the single lens 32, it could be placed at an image plane of the lens system, in either of which cases it need be opaque to light only. As a further alternative, screen 26 can be manufactured with only a thin line of fluorescent material on it in the location of slit 30, in which case no mask will, of course, be necessary. As a further alternative, a row of small holes substantially occupying the area of slit 30 can be employed in place of the slit.

3,036,152
HIGH SPEED SHUTTER

Jeofry S. Courtney-Pratt, Springfield, N.J., assignor to Bell Telephone Laboratories, Incorporated, New York, N.Y., a corporation of New York
Filed Oct. 14, 1960, Ser. No. 62,573
1 Claim. (Cl. 178—6.8)

This invention relates to electro-optical devices. More particularly, it relates to such devices having extremely fast response times.

This is a companion application to my copending application Serial No. 62,583, filed Oct. 14, 1960, concurrently with the present application.

In very high speed photography, exposures approximating a millimicrosecond or shorter are highly desirable in order that, for example, such rapidly developing phenomena as the motions of the wave fronts of explosions may be determined.

Shutter mechanisms of the prior art dependent upon the movement of mechanical parts usually cannot even approach reliable operation for such short exposure intervals in view of friction and/or inertia effects.

Various prior art shutter devices dependent upon electrical control also cannot closely approach the above indicated speed of operation because of large capacitance or inductive effects inherent in the electrical control apparatus and circuits.

In accordance with the present invention it is proposed to achieve extremely fast exposure times by electronically sweeping the image to be photographed past a narrow slit in a masking device to continuously sample the entire image and simultaneously to reconstitute the image by electronically sweeping a reproduction of the sampling slit across a fluorescent screen in synchronism with the sampling procedure to reconstitute the image. The so-called "image-converter tube" equipped with either electromagnetic or electrostatic deflection means can be employed. As the only "moving parts" are electrons, the sweeping procedures can be extremely rapid. Indeed, the limiting factor is the sensitivity of the emulsion of the photographic film.

A principal object of the invention is, accordingly, to eliminate difficulties ordinarily encountered when it is desired to obtain very short image exposure times in high speed photography systems and the like.

Other and further objects, features and advantages of the invention will become apparent from a perusal of the following detailed description of specific illustrative embodiments exemplified in the accompanying drawings, in which:

FIG. 1 illustrates an arrangement of the invention employing two electronic image converter tubes; and FIG. 2 illustrates a modification of the arrangement of FIG. 1 whereby one electronic image converter tube can be employed instead of two.

The general process is to continuously sample the entire image to be photographed and to simultaneously reconstitute the image from the samples.

In more detail in FIG. 1, arrow 10 represents an object the image of which is to be photographed using an exposure interval for each "sample" which is very short, for example one millimicrosecond or less (that is, $10^{-9}$ second or less).

Lens 12 is arranged to focus an image 16 of object 10 on the cathode surface 14 of a first image converter tube 18. The cathode surface 14 is photosensitive so that light impinging upon it causes electrons, indicated by broken lines 15, to be emitted from its surface. At the other end of tube 18 is the fluorescent screen 26 which responds to electrons to produce visual signals the in- In accordance with conventional practice, a biasing voltage source 17 is connected between cathode 14 and screen 26 to draw the electrons at high speed from cathode 14 to screen 26. One specific, commercially-available, type of image converter tube suitable for use in arrangements of the invention is, for example, that manufactured by Mullard Limited, London, England, under the designation ME 1201 AA. For this tube, voltage source 17 should typically be 6000 volts.

Deflecting coils 20 when actuated from source 22 by closure of switch 24 cause the electrons emanating from cathode 14 to be deflected vertically, the voltage of source 22 being such that the image 28 on mask 27 of screen 26 (an image of the image 16 on the cathode) is swept from a position initially above the slit 30 to a position below the slit 30 so that image 28 is continuously "scanned" as it passes slit 30. It is apparent from inspection that the exposure interval for each element of the image is proportional to the separation between the long edges of the slit. The time required to photograph the entire image is, however, that required for the entire image to be swept past the slit. Unless extremely short exposure times are desired, a moderately wide slit can obviously be advantageously employed.

Lens 32 focusses an image 34 of slit 30 on cathode surface 38 of the second (right) image transfer tube 42. Electrons given off by cathode 38 are accelerated toward fluorescent screen 48 by bias 17 and vertically deflected by coils 20 when switch 24 is closed connecting source 22 to coils 20. One source 22 and one switch 24 are preferably connected to both sets of deflecting coils 20 since it is desired to synchronize the deflections of the electron streams of both of the tubes 18 and 42. Alternative synchronizing arrangements can be readily devised, of course, by those skilled in the art. Source 22 should provide a current varying linearly with time. Switch 24 is preferably an instantaneously operative switching device such as a hydrogen or other gas thyratron.

From the above described arrangements it will be apparent from inspection that the image 44 appearing on screen 48 will be a simultaneously effected reconstitution of image 28 as it is deflected past slit 30 and causes appropriate intensity modulations of the slit image 34 of slit 30 appearing on the cathode surface 38 of tube 42. Image 44 can be photographed, of course, by camera 50. Since the only moving parts are the electrons of tubes 18 and 42 and deflecting coils 20 need have only moderate inductance, the sweeping of any given line or strip of image 28 past slit 30 of tube 18 can be accomplished very rapidly, for example in $10^{-9}$ second. Opaque shielding arrangements, not shown, should of course be employed to exclude extraneous light.

In FIG. 2 an essentially similar arrangement to that described in detail above in connection with FIG. 1 is employed, the major difference being that instead of using two image converter tubes 18 and 42 only one converter tube 64 is employed and is in effect divided along its central vertical plane, the rear half, as shown in FIG. 2, then performing the functions of tube 18 and the front half performing the functions of tube 42. A reflecting system comprising the four mirrors 60 and lens 32' inverts and transfers the image of the sampling slit 28' to the front half of the cathode of the tube. The reconstituted image 44' is photographed by camera 50'. In the same manner as for tube 18 of FIG. 1, an image 16' of the object 10 is focussed by lens 12' on the rear half of cathode 14'. A mask 27' having a narrow slit 30' is positioned on the inside (or outside) of the rear half of the fluorescent screen 26'. Coils 20 energized from source 22 by closure of switch 24 deflect electrons from both halves of cathode 14' in synchronism thus effecting the scanning of image 28' by slit 30' and the reconstitution of the image as image 44'. As stated above, the image of slit 30' is transferred by reflection through mirrors 60 to the front half of cathode 14'. Obviously those skilled in the art could readily devise other arrangements for effecting this transfer as, for example, by a suitable array of light conducting fibers. The alternatives suggested above for mask 27 of FIG. 1 are obviously also applicable in the case of mask 27'. In either case, the use of a standard image converter tube will normally be found preferable to using one having a specially shaped active surface of its fluorescent screen. Likewise, an external mask will usually be preferable since it can be readily applied to an otherwise standard image transfer tube.

Numerous and varied modifications and rearrangements of the specific illustrative embodiments described in detail above will readily occur to those skilled in the art within the spirit and scope of the principles of the invention. No attempt to exhaustively illustrate all possible embodiments has been made.

What is claimed is:

A shutter arrangement for high speed photography comprising first and second electronic image converter tubes, each tube including a photosensitive electron emitting cathode surface, an electron sensitive fluorescent screen spaced from the cathode in a substantially parallel plane, a source of potential interconnecting the cathode and screen surfaces to draw electrons from the cathode to impinge upon the screen and means for deflecting electrons passing from cathode to screen in a first transverse direction, means for focussing the image to be photographed on the cathode of the first image converter tube, masking means associated with the fluorescent screen of the first transfer tube the masking means having a transverse transparent slit normal to the direction of transverse deflection, means for focussing an image of the transparent transverse slit on the cathode of the second transfer tube, means for transversely deflecting electrons passing from the cathode to the screen of the second transfer tube in synchronism with the deflection of the image across the transverse slit of the first transfer tube, and means for photographing the image as reconstituted on the fluorescent screen of the second image transfer tube.

References Cited in the file of this patent

UNITED STATES PATENTS

| | | |
|---|---|---|
| 2,839,602 | Fries | June 17, 1958 |
| 2,859,377 | Clemens | Nov. 4, 1958 |
| 2,871,400 | Buntenbach | Jan. 27, 1959 |